Figure 1:
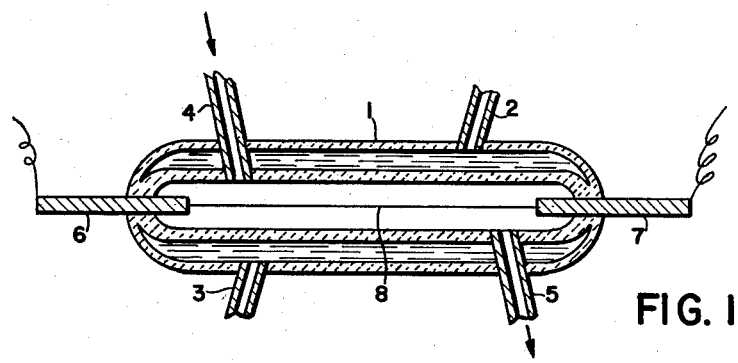

Aug. 25, 1964  F. BISCHOFF  3,146,123

METHOD FOR PRODUCING PURE SILICON

Filed Feb. 8, 1961

3,146,123
METHOD FOR PRODUCING PURE SILICON
Friedrich Bischoff, Hagen, Westphalia, Germany, assignor to Siemens & Halske Aktiengesellschaft, Berlin, Germany, a corporation of Germany
Filed Feb. 8, 1961, Ser. No. 87,885
Claims priority, application Germany May 18, 1954
8 Claims. (Cl. 117—106)

My invention relates to pyrolytic methods for producing silicon of highest purity, especially for electronic semiconductor purposes, and is herein disclosed as a continuation-in-part of my copending application Serial No. 509,351, filed May 18, 1955, now abandoned.

It is known to obtain purest silicon from a gaseous phase, fo rexample, by reduction or by thermal decomposition of suitable silicon compounds, preferably after preparatory purification. Silicon halides, particularly chlorides, have been employed as initial materials, using as a suitable reaction agent zinc and hydrogen, for example. In the known methods, the elementary silicon formed in the reaction is precipitated upon a clean support, generally upon a wall of a vessel which is generally held at a lower temperature, and the silicon accumulates on the wall as a more or less coarse crystalline powder which must be melted before subsequent processing for semiconductor purposes.

It is an object of my invention to avoid in the production of electronically pure silicon the detour going over the gaseous phase to the powder form, by precipitating the silicon obtained in the gaseous phase upon a body consisting of silicon. There may be obtained in this manner, from a relatively small piece of silicon, a silicon body of any practically desired size while eliminating the pressing, sintering and melting of the pulverulent silicon previously obtained in the gaseous phase.

Another object of the invention is to not only save processing steps, but to also avoid contacting of the pure silicon obtained, with walls of vessels or other appliances from which it might acquire contaminations.

It has been proposed to produce germanium and other substances by precipitating them from a gaseous compound upon a wire of tungsten or germanium heated by passing electric current therethrough, the wire, such as a monocrystal of germanium, being sufficiently conductive to be heated in this manner up to incandescent precipitation temperature and to ultimately serve as an electrical connection to the semiconductor body deposited thereupon. This method, however, has been unsuitable for the production of such highly pure silicon as needed for transistors, rectifiers and other electronic semiconductor devices. It is therefore another object of my invention to afford producing silicon by pyrolytic precipitation upon a carrier to not only obtain a compact crystalline body of any desired thickness, but to also reliably meet the extreme purity requirements of electronic use.

According to the invention, the hyperpure silicon is precipitated by thermo-chemical (pyrolytic) decomposition upon a relatively thin carrier body, preferably an elongated wire- or filament-like member, which consists likewise of hyperpure silicon and has a degree of purity corresponding to that of the material being produced by the method. If desired, the carrier itself may be produced by the new method or by other known or proposed methods, for example, from a melt by drawing through a crystal or by a gas discharge process, for example, as described in the copending application Serial No. 464,129, filed October 22, 1954. The carrier gradually grows by the application of the invention to form a body of a desired thickness.

In accordance with another feature of the invention, the carrier body is a suitably oriented monocrystal on which the obtained particles crystallize such as to cause the carrier body to grow on all sides in the directions of its basic planes, thus producing a large monocrystal.

In accordance with a further feature of the invention, the carrier body is also employed to serve as a heat source for the thermal decomposition by heating it, for example, by radiation or by high frequency, after some preheating thereof, and/or by direct passage of current therethrough.

In order to obtain particularly uniform growth conditions, it is advantageous to rotate the carrier body, especially about the filament or rod axis.

It is within the scope of the invention to precipitate from the gaseous phase in the reaction process, with the elementary substance, desired addition substances, especially such as will produce impurity centers, for example, donors, acceptors, adhesion areas, thereby producing a doped semiconductor. The foreign substances may if desired and as needed be added only at intervals, periodically, so as to produce p-n junctions or other junctions between zones of differentiating conduction type.

The foregoing and other objects and features of the invention will be set forth below with reference to the accompanying diagrammatic drawings, wherein FIG. 1 shows an example of apparatus for carrying out the invention; and FIG. 2 indicates another example of such apparatus.

Numeral 1 in FIG. 1 indicates a double-walled quartz vessel forming an outer cooling chamber through which cooling water may be circulated by means of the conduits 2 and 3. Two conduits 4 and 5 are provided for conducting through the inner processing or reaction chamber of the vessel 1 a mixture of a semiconductor halide, particularly silicon chloroform or another silicon chloride and hydrogen. Two electrodes 6 and 7 made, for example, of tungsten, are fused in the walls of the vessel 1 and between these electrodes extends a filament 8 made of silicon. This filament is heated by passing current therethrough, thereby causing decomposition of the gaseous silicon combination and thus producing pure elementary silicon which precipitates upon the filament 8.

The operation is carried out with the reaction gas circulating through the inner reaction chamber. The silicon precipitant accordingly grows steadily upon the filament or wire 8, the latter thereby becoming after some time a relatively thick rod which may be processed in known manner for producing semiconductor devices, for example, rectifiers, transistors, photo-transistors, and other electronic semiconductor devices.

The example described above may be modified in many ways. For example, several semiconductor wires or filaments may be disposed in the reaction chamber in parallel relationship. The vessel may be in known manner made so as to form a multicell structure with correspondingly subdivided cooling jacket means. The electrodes such as the electrodes 6 and 7, at least the portions inside the reaction chamber, may be coated with the semiconductor substance which is to be produced, namely silicon, or may consist of such substance. Several and additional conduits may be provided for admitting other gases or vapors by means of which the doping substances can be conducted into the reaction chamber.

In order to avoid with certainty occasional tearing of the filament-like semiconductor carrier, especially incident to the heating thereof by direct passage of current therethrough, the carrier is formed, so far as regards its temperature response, its size, and its mounting, so that tensile stresses caused by its weight and/or surface forces acting thereon remain within permissible limits.

It is of course desirable to use for the carrier as little material as possible because it must consist of the same highgrade substance that is to be obtained by the method according to the invention. Such method accordingly consists basically in the utilization of means for causing continuous thickening of an initially relatively thin filament or wire or a thin membrane made of such highgrade substance. The thicker the initial carrier is, the more elaborate and costly will be the preparations for carrying out the method.

Investigations underlying the invention have shown that it is of advantage to remain with respect to the thickness of the carrier—which may be made in the form of a plate, membrane, ribbon-like strip, rod or drawn wire or filament—above a predetermined lower limit, so as to assure reliable operation. The lower limit accordingly should be on the order of 0.2 mm. or, for obtaining greater safety, it should be on the order of from 0.5 mm. to 1 mm.

The lower limit of permissible thickness, at which tearing of the carrier is prevented, depends moreover upon the temperature to which the carrier is heated and also upon its mounting. The higher the temperature, the thicker must be the carrier. It is on the other hand possible to utilize smaller dimensions by skillful mounting and arrangement of the carrier. It is of advantage, for example, to carry out the heating by passage of current through the carrier and to utilize the current supply or inlet terminal elements for mounting or securing the carrier. The terminal elements should be arranged symmetrical with respect to the carrier, that is, in the case of a wire, rod or filament, at the ends thereof, and the carrier should be welded or soldered to the terminal elements so as to avoid shaky contacts and non-uniform heating that may be caused thereby. In accordance with the invention, the contacting is carried out with avoidance of formation of eutectic alloys or combinations. It is moreover advantageous to provide the carrier with somewhat thickened or enlarged mounting ends. Supports may also be provided for the carrier body at other points thereof. In the case of plate-like, preferably circular carriers, the current is conducted thereto over terminal means respectively in engagement with a central point and peripherally thereof. Rod-like, filament-like or wire carriers are formed as straight as possible and arranged vertically.

The smallest carrier dimensions are obtained whenever cold precipitation is possible, as it may be caused, for example, by a glow discharge. Upon heating of the carrier to elevated temperature and, as may be needed, to glow temperature, the corresponding heating may in accordance with the invention be regulated, advantageously in known manner automatically, for example, by use of radiation pyrometers. In some cases, the regulation may be carried out based upon experience in accordance with other parameters, for example, in accordance with the current or voltage values. The regulation is important because the carrier grows in the processing to a body of increasing thickness, thus forming at any instant a carrier of different thickness for receiving the reaction substance. It is therefore important to hold the surface temperature constant.

Inasmuch as the requirements for the dimensioning must be observed with greater strictness for the initial carrier body than for the thicker body, the kind of precipitation and/or the heating of the carrier are in accordance with a further feature of the invention altered during the carrying out of the method. For example, cold precipitation, such as with a glow discharge, may be initially utilized, until a predetermined thickness of the carrier body is obtained, followed by a faster precipitation by thermal decomposition. The heating may be altered by initially heating in known manner from the outside, by radiation, and thereupon by high frequency and/or direct passage of current.

So far as the configuration of the carrier is concerned, the elongated cylindrical rod-like, filament-like or wire-like shape is to be particularly recommended, and such carrier should be arranged vertically. As mentioned before, the carrier body itself may be obtained from the gaseous phase. As proposed in the above-mentioned copending application, the substance to be produced is by chemical conversion precipitated upon electrodes which are pulled apart in accordance with the resulting crystal growth thereon. By vertically disposing at least one electrode on which the substance to be obtained is precipitated, there will result a rod-like or filament-like body forming the carrier for practicing the invention.

In accordance with another feature and object, the carrier produced as indicated in the preceding paragraph is subsequently exposed to reaction in the same reaction chamber, the free end of the carrier being for this purpose connected with the coacting electrode and if desired fused thereto. The electrode leads which were in such case initially used for feeding the gas discharge are thereupon employed for supplying the current for the heating of the carrier.

The use of the identical vessel for the two successive operations avoids any contamination of the carrier and also mechanical stresses acting thereon that might cause breaking it.

The rod-like or wire-like configuration also recommends itself for another reason. In accordance with another feature of the invention, it is possible to treat the thickened rod-like body (for the purposes described in copending applications Serial Nos. 409,420 (now Patent No. 3,086,856) and 409,494, filed on February 10, 1954 (now abandoned and replaced by Serial No. 13,309, filed March 7, 1960)) directly following its formation, so as to obtain further purification and/or to dope it with additions, affecting the semiconductor properties, for example, donors, acceptors, adhesion areas, re-combination centers; and/or distribute such addition substances either homogeneously over the entire rod-like body or so as to produce desired zones of different doping.

It is possible by such method to either cause coarsening of the crystal structure, or to obtain a monocrystalline structure of the entire rod-like body.

The zone melting operation is suitably carried out in the same reaction vessel in which the rod-like body or member had been produced by thickening precipitation according to the invention. The three operations referred to, for the production of the initial carrier, for its growth and thickening, and for the zone melting or merging may be carried out in one and the same apparatus. A substantially cylindrical configuration of the reaction vessel matching the rod-like configuration of the body to be produced is recommended particularly for the thickening or growth operation so as to obtain a washing of the body with reduction gas in as uniform a manner as possible. Radiation rings and/or high frequency coils for heating either the entire carrier or desired zones thereof may in known manner be provided on or within a vessel of cylindrical configuration.

Temperatures between 900° and 1400° C. and preferably between 1200° and 1300° C. have been advantageously applied in the production of silicon.

Figure 2:
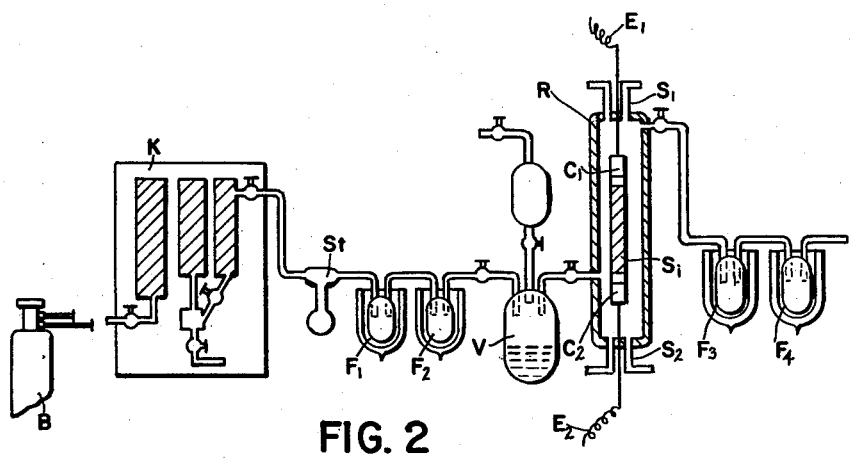

Referring now to FIG. 2, B indicates a steel container holding electrolyte hydrogen. The gas flows by way of a copper tower K, a gas flow meter St, two cooling traps F1 and F2 containing liquid air into the vaporizer V for SiHCl₃ and from there, with the SiHCl₃ vapors into the tubular reactor R which is in known manner provided with suitable water cooling means (not shown). Current supply means are indicated at E1 and E2; reference characters C1 and C2 indicate carbon contacts between which is mounted a silicon rod Si. Such rod is heated to glow temperature by the current passing therethrough. Pure silicon is precipitated on the rod Si from the gas mixture flowing through the reaction chamber causing progressive thickening of the rod. The spent gases with residual reaction gas flow to a suitable exhaust or to suitable processing means through cooling traps F3 and F4 which are filled with acetone.

The commercially available hydrogen is in customary manner purified and passes through the SiHCl₃ vaporizer V, thus acquiring SiHCl₃, residual unspent amounts of which are removed in the cooling traps F3 and F4. The tubular reaction vessel R may be a quartz tube provided with inlets and outlets made of normally polished glass. The current supply leads E1 and E2 may be molybdenum wires which extend in vacuum-tight manner through glass seals S1 and S2, respectively, carrying at their respective inner ends the contacts or terminals C1 and C2 made of spectral carbon.

Only relatively weak current flows with a voltage of 220 and 380 volts through the pure silicon rod at room temperature, resulting in loads of only about 2 to 6 watts, and the required preheating can therefore be carried out by directly passing through the rod high voltage by suitable means. The required preheating is obtained at about 50 watts within about 10 minutes. The commercial current is thereupon applied increasing the amperage from about 0.5 up to between 15 and 25. The desired glow temperature of the silicon rod is set by means of an optical pyrometer and held constant for an initial period. The diameter of the rod grows with progressive silicon precipitation and the glow temperature must accordingly be readjusted. For the calculation of the adjusting temperature from the desired temperature according to Wien's radiation formula, the character of the rod may be assumed to be 0.5 in accordance with the emission coefficient for silicon. Temperatures actually applied varied from about 900° to about 1200° C.

The supply of SiHCl₃ and hydrogen was initially carried out with a concentration (hydrogen 25 liter/hour; the SiHCl₃ was kept at a temperature 20 to 25° C.) used in the production of silicon according to the discharge method. The hydrogen may, by known and suitable means, be switched to the SiHCl₃ vaporizer and the addition and switching-off of SiHCl₃ may accordingly be effected at a predetermined time. SiHCl₃ is called trichlorosilane or silicochloroform.

As explained, the thin silicon rod which serves as a carrier body must have a purity at least corresponding to that of the hyperpure silicon being produced, and this carrier rod must be preheated, either by application of high voltage to obtain correspondingly increased wattage, or by heating it from the outside, such as by radiation, up to glowing temperature, before the processing proper is commenced and maintained by passing regulated electric current through the thickening rod from the source of normal processing voltage as constituted by a commercial utility line of 220 volts, for example. A silicon carrier rod satisfying such exacting purity requirements is virtually non-conducting when cold, i.e., at room temperature (20° C.), so that its electric resistance is too high to permit heating the rod to the high processing temperature of 900° C. or more, with the aid of voltage in the normal processing range. The extreme purity of the silicon to be used for the carrier rod also manifests itself by an extremely great ratio between the high resistance value at room temperature and the very small resistance value at the high processing temperature.

Thus in the above-described example, the values $E=220$ volts processing voltage and the power of $W=2$ watts imposed thereupon when the carrier rod is at room temperature, corresponds to a current flow of about $I=0.01$ amp. ($I=W/E$) and to a resistance above $R=24,000$ ohms ($R=E/I=E^2/W$). The same approximate resistance value follows from the 380 volt and 6 watt values also given in the above-described example. In contrast, when after preheating, the precipitation process is carried out by regulated processing voltage up to the utility-line voltage of 220 volts to drive through the rod a current of 15 to 25 amps., the resistance of the rod ($R=E/I$) has declined to from about 24,000 ohms (cold) to about 10 ohms (hot). Thus the resistance at room temperature is of a higher order of magnitude than the resistance of the same silicon rod at the precipitation temperature above 900° C.

A rod of such extreme resistance at room temperature cannot be heated by processing voltage within the normal range because the resistance of hyperpure silicon at low temperature is thermo-positive and hence remains similarly extreme (indeed further increases) up to a high temperature where intrinsic conductance becomes preponderant and the extrinsic conductance vanishes. From then on, the resistance declines at a steeply increasing rate (exponentially) with further increase in temperature. Using a carrier rod of metal or monocrystalline silicon of sufficient impurity concentration to support a greater amount of current when at room temperature fails to produce the desired results because at the extreme temperatures (for example about 1200° C.) of the subsequent pyrolytic precipitation process, the impurities diffuse from the carrier into the precipitated silicon so that the ultimate product, regardless of the hyperpurity of the precipitate itself, is excessively contaminated and the impurity distribution becomes non-uniform, the product having much higher impurity concentration in its interior than in the regions nearer to the surface.

The above-described preheating of the hyperpure carrier body by radiation from the outside or by initial application of high voltage avoids such spoilage. When preheating by high voltage, such voltage, of course, must be far above the range of normal processing voltage subsequently used for heating and temperature regulating the body during silicon precipitation. Thus, in the above-described example, the voltage required for subjecting the silicon rod of about 24,000 ohms initial resistant to a heating power of about 50 watts is above 1100 volts, as compared with the voltage, for example up to 220 volts, subsequently applicable for the processing proper. However, the initial, high voltage is required only for a short preheating period, such as the 10 minutes mentioned above, whereas the precipitation process proper may have to be performed for hours or days, depending upon the desired thickness of the product.

The fact that, preferably, the carrier rod and the growing rod product are attached and electrically heated between contacts of carbon, or the same silicon as to be produced, also contributes to obtaining the desired high-quality product. With silicon or silicon-coated contacts, the diffusion of impurities from the contacts into the product is avoided. This also applies to spectral (pure) carbon and is important because, due to the long duration of the precipitation process, the migration of impurities from the contacts into the product may considerably impair if not spoil the product. Furthermore, the relative poor heat conductance of such contacts cause the silicon rod to be kept at full temperature up to its ends, since the temperature gradient from the heated rod to the cool parts of the processing equipment takes place in the carbon or silicon contacts rather than in the end portions of the rod, thus securing a better uniformity of the product.

Of particular advantage, too, is the above-described mounting of one or more carrier rods in vertical position and passing the reaction gas, preferably silico-chloroform (SiHCl₃) mixed with hydrogen, upwardly along the rod through the processing vessel. This secures a uniform envelopment of the rod or rods by the ascending fresh gas flow. The preferred vertical arrangement of the rods also permits the above-described zone-melting of the product immediately following the pyrolytic process in the same processing vessel by means of radiation rings or high-frequency heating coils, such zone-melting being not applicable with horizontal rods for lack of sufficient support of the melting zone.

The above-mentioned preheating of the carrier body from without by heat radiation is particularly advantageous when an extremely high degree of purity is required of the products. For example, electronic-grade silicon may be required to have a content of less than $10^{-7}\%$ impurity. A rod 1 mm. in diameter and 20 cm. long made of this material could be sufficiently preheated only by initially applying a voltage of several 10,000 volts or more. Hence the application of extraneous preheating by radiation is the more preferable the higher the degree of purity.

I claim:

1. The method of producing hyperpure silicon for electronic semiconductor purposes by precipitation of silicon from a gaseous silicon-halogen compound, which comprises disposing within a reaction vessel a carrier body of hyperpure silicon having a purity corresponding approximately to the purity of the silicon being precipitated and having when at room temperature an electric resistance of a higher order of magnitude than the resistance of the same silicon at the precipitation temperature above 900° C., heating said carrier body to a precipitation temperature between 900° C. and 1400° C. and maintaining said body heated at said precipitation temperature, simultaneously passing the gaseous silicon compound mixed with hydrogen as a reactive carrier gas into contact with the body and maintaining the walls of the vessel at a substantially lower temperature, and removing spent gases from the vessel, thereby precipitating silicon in compact and crystalline form onto said carrier to produce a gradually thickening silicon crystal.

2. The method of producing crystalline hyperpure silicon according to claim 1, wherein said carrier body is monocrystalline and the silicon produced is in monocrystalline form.

3. The method of producing hyperpure silicon according to claim 1, wherein said carrier body is a flat surface member.

4. The method of producing hyperpure silicon according to claim 1, wherein said silicon-halogen compound is silicochloroform.

5. The method of producing hyperpure silicon according to claim 1, wherein said carrier body has, when at room temperature, an electric resistance too high for a subsequently used processing voltage to heat said body to a high temperature at which precipitation of silicon takes place, preheating said carrier body by means other than applying said processing voltage up to a high temperature at which said body becomes sufficiently conductive for obtaining said high temperature due to current driven through said body by said processing voltage, and thereafter maintaining said body at said high temperature by means of said processing voltage.

6. The method of producing hyperpure silicon according to claim 5, which comprises preheating the carrier body by radiation from outside of said vessel.

7. The method of producing hyperpure silicon according to claim 5, which comprises holding the carrier body by a structure selected from the group consisting of carbon and silicon.

8. The method of producing hyperpure silicon for electronic semiconductor purposes by precipitation of silicon from a gaseous silicon-halogen compound, which comprises vertically disposing within a reaction vessel an elongated and relatively thin carrier body of hyperpure silicon having a purity corresponding approximately to the purity of the silicon being produced and having when at room temperature an electric resistance of a higher order of magnitude than the resistance of the same silicon at 900° C., preheating the carrier body by means other than applying said processing voltage to a temperature between 900° and 1400° C. at which said body becomes sufficiently conductive for obtaining said high temperature due to current driven lengthwise through said body by said processing voltage; thereafter maintaining said body at said high temperature by means of said processing voltage; simultaneously passing a gaseous silicon-halogen compound and hydrogen, a reactive carrier gas, into said vessel from below so as to flow upwardly along said body, and simultaneously maintaining the wall of said vessel at a substantially lower temperature, the heat of said body decomposing said silicon compound whereby silicon precipitates in compact and crystalline form from said compound upon said carrier body and thickens said body, and withdrawing residual gaseous matter from said reaction vessel.

References Cited in the file of this patent

UNITED STATES PATENTS

| | | |
|---|---|---|
| 1,601,931 | Van Arkel | Oct. 5, 1926 |
| 1,617,161 | Koref et al. | Feb. 8, 1927 |
| 2,160,177 | Shuman | May 30, 1939 |
| 2,441,603 | Storks et al. | May 18, 1948 |
| 2,671,739 | Lander | Mar. 9, 1954 |
| 2,754,259 | Robinson et al. | July 10, 1956 |
| 2,763,581 | Freedman | Sept. 18, 1956 |
| 2,910,394 | Scott et al. | Oct. 27, 1959 |
| 2,912,311 | Mason et al. | Nov. 10, 1959 |
| 2,989,376 | Schaeffer | June 20, 1961 |
| 3,020,129 | Herrick | Feb. 6, 1962 |
| 3,023,087 | Enk et al. | Feb. 27, 1962 |

OTHER REFERENCES

Fiat Final Report 789, "Experiments to Produce Ductile Silicon," Smatko, April 3, 1946, pp. 1-5.